June 3, 1952   A. E. WEIGELE   2,598,951
ELECTRICALLY OPERATED WINDSHIELD WIPER
Filed June 22, 1945   3 Sheets-Sheet 2
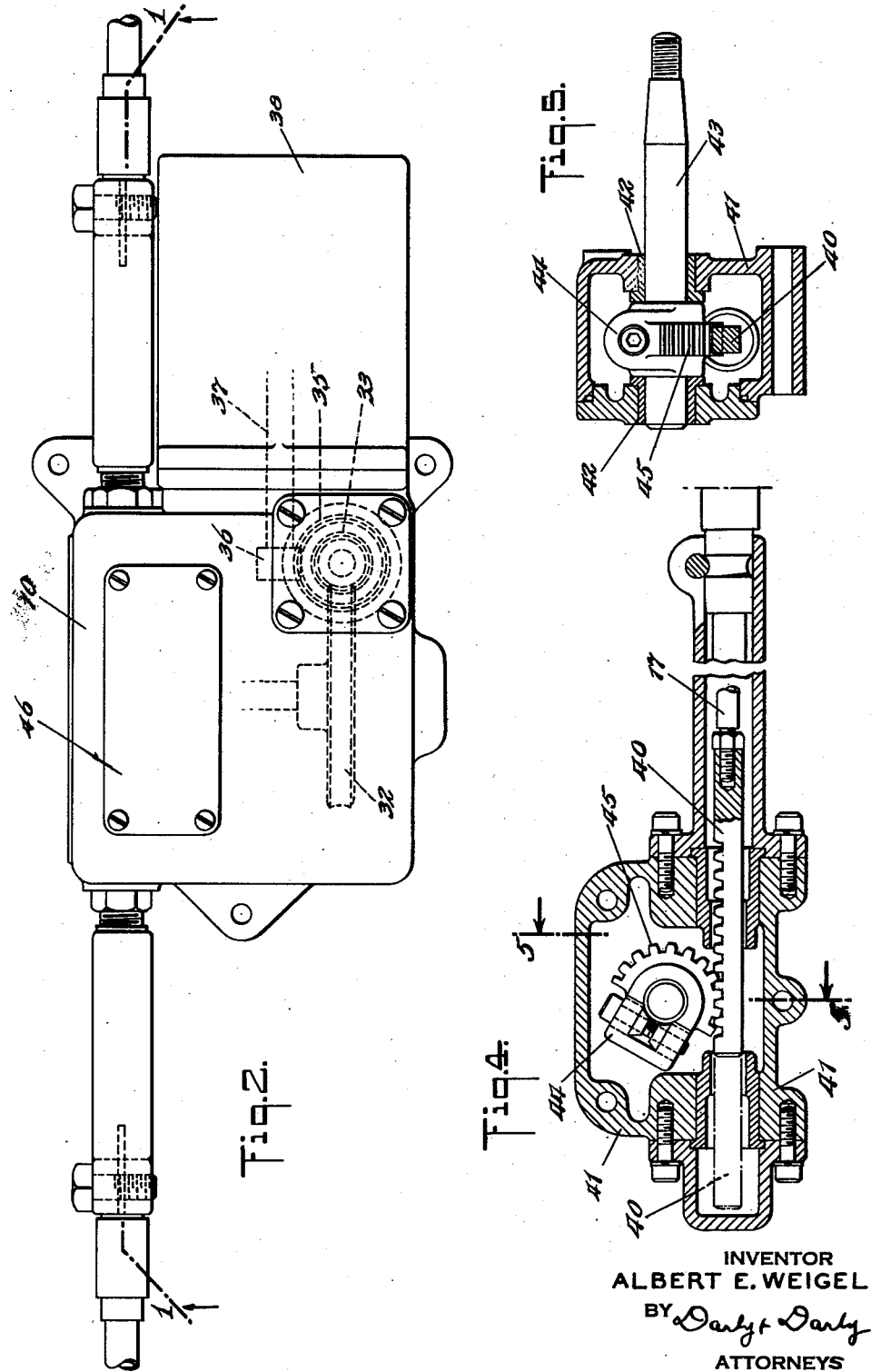
INVENTOR
ALBERT E. WEIGELE
BY Darby & Darby
ATTORNEYS June 3, 1952  A. E. WEIGELE  2,598,951
ELECTRICALLY OPERATED WINDSHIELD WIPER
Filed June 22, 1945  3 Sheets-Sheet 3
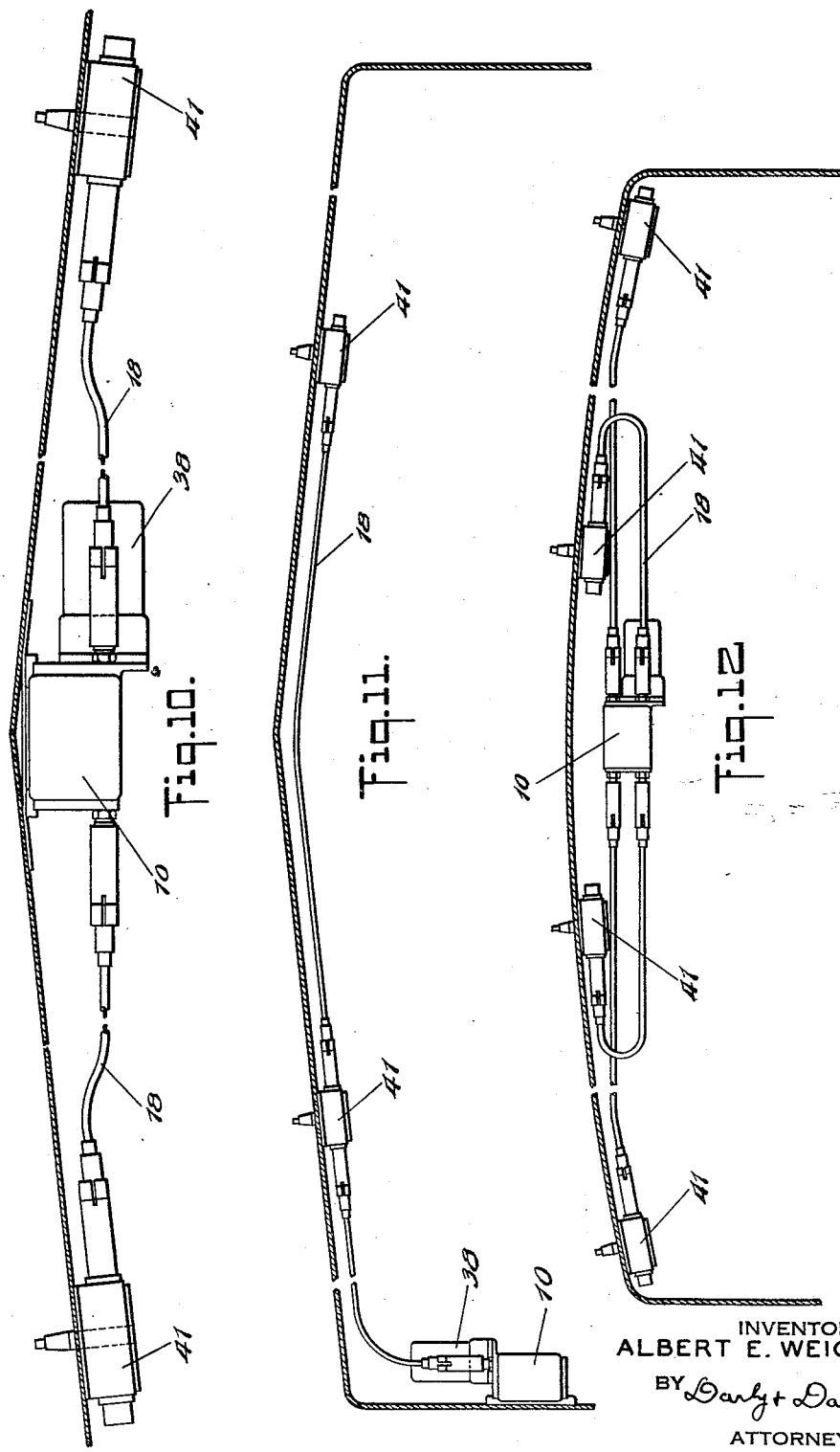
INVENTOR
ALBERT E. WEIGELE
BY Darly + Darly
ATTORNEYS Patented June 3, 1952

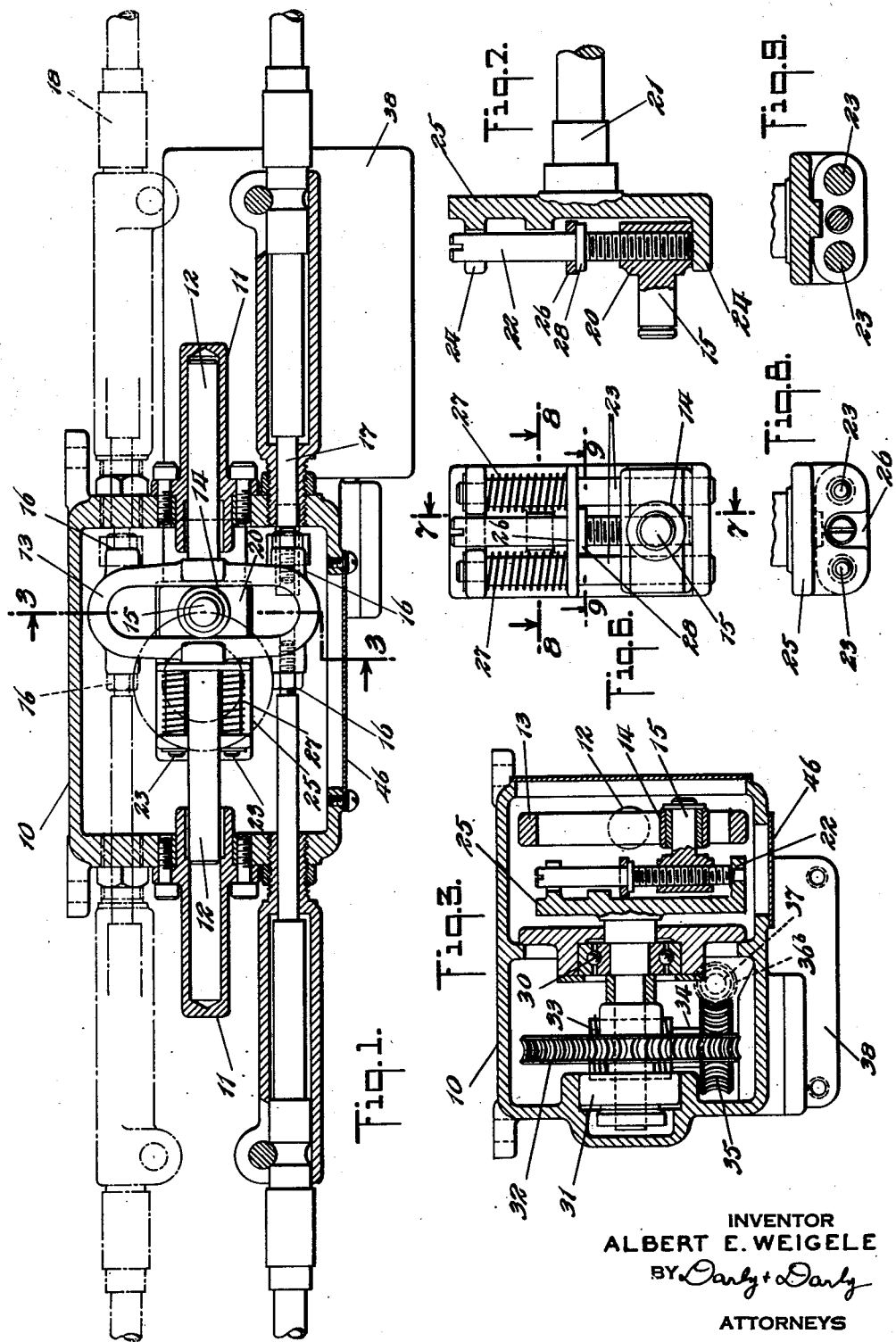

2,598,951

UNITED STATES PATENT OFFICE 2,598,951

ELECTRICALLY OPERATED WINDSHIELD WIPER

Albert E. Weigele, Newark, N. J., assignor, by mesne assignments, to National Pneumatic Company, Inc., Boston, Mass., a corporation of Delaware Application June 22, 1945, Serial No. 600,867

7 Claims. (Cl. 15—253)

The present invention relates to windshield wipers, and particularly to such wipers which are electrically operated as contrasted to the usual operation from the intake manifold vacuum.

More particularly still, the invention contemplates a power unit having flexible connections to one or a plurality of oscillable wiper arms. The electrically operated windshield wiper of the present invention is provided with means whereby the angle of sweep of the wiper blades may be changed, over a range of sweep movement from 75° to 120°, by means of a very simple adjustment. The mode of adjustment is such that the wiper arm and blade may be adjusted to maintain equal travel on either side of a vertical position for any sweep angle, this adjustment being made without in any way altering the position of the wiper arm relative to its drive shaft.

Furthermore, when slush or snow or sleet accumulates on the windshield it sometimes happens that the power available is not sufficient to permit full sweep of the blade and consequently the wipers stall and become useless. Means are provided in a device of this invention to prevent such stalling from occurring.

It is an object of the present invention to provide an electrically operated windshield wiper particularly for transportation vehicles which is simple and rugged in construction and readily and economically manufactured.

It is another object of the invention to provide a power unit for such an electrically operated windshield wiper capable of supplying power to a number of wiper arms and blades.

It is another object of the invention to provide an electrically operated windshield wiper in which the sweep angle of the blade or blades may be readily adjusted from a maximum to a minimum and in which equal sweeps on either side of the vertical may be readily obtained.

It is a further object of the invention to provide a windshield wiper of the class described in which means are present to prevent stalling of the wipers under adverse weather conditions.

Other objects and features of the invention will be apparent when the following description is read in connection with the appended drawings in which—

Figure 1 is a transverse cross-sectional view of the power unit of the wiper of my invention taken on the plane of the line 1—1 of Figure 2;

Figure 2 is a side elevation of the power unit;

Figure 3 is a vertical cross-sectional view of the power unit, taken on the line 3—3 of Figure 1; for convenience the view has been rotated clockwise through 90°;

Figure 4 is a cross-section of the wiper operating unit;

Figure 5 is another cross-section of the wiper operating unit, this section being taken on the plane of the line 5—5 of Figure 4;

Figure 6 is a detailed view of the means for adjusting the sweep angle of the wiper blades as well as of the means for preventing stalling of the blades;

Figure 7 is a cross-sectional view of the mechanism of Figure 6, the section being taken on the plane of the line 7—7 of Figure 6;

Figure 8 is a cross-sectional view of the mechanism of Figure 6 taken on the plane of the line 8—8 of Figure 6;

Figure 9 is a cross-sectional view of the mechanism of Figure 6 taken slightly below the cross-section of Figure 8 and specifically on the plane of the line 9—9 of Figure 6; and Figs. 10, 11 and 12 are illustrations of three different methods of assembling and installing the component elements of the system.

Referring now to Figure 1, there is shown therein the power unit which comprises a housing 10 having mounted in its ends the cylindrical guides 11 in which rods 12 fastened to the yoke 13 reciprocate. Mounted within the yoke 13 is a roller 14 which roller is in turn mounted on a stud or crank pin 15 which, under drive of an electric motor in a manner subsequently to be described, rotates in a circular path, as indicated by the dotted line of Figure 1. As a result of such rotation the yoke 13 guided by the rods 12 is reciprocated. Fastened to the yoke 13 at the four points 16 are the core members 17 of four flexible operating cables generally designated 18. These cables are of conventional construction and provide means for transferring the reciprocating movement of the yoke or cross-head 13 to the wiper actuating units which will be described later.

The crank pin 15 is mounted on a block 20, the block being adjustable inwardly and outwardly relative to the center of drive shaft 21 by means of the screw 22. Block 20 in addition to being threaded for reception of screw 22 is provided with a hole on either side thereof through which the guide pins 23 (Figures 6 and 9) extend. The guide pins 23 extend through holes in arms 24 projecting from a bracket 25, serving as a crank arm, which is fixed to shaft 21 for rotation therewith. A plate 26 is slidable on the pins 23 and is held in its lowermost position by the springs 27 which bear against the plate 26 and the upper arms 24. A collar 28 on screw 22 bears against the lower surface of the plate 26. It will be seen that as a result of the structure just described, screw 22 is effective to adjust the position of block 20 and crank pin 15 relative to the center of the shaft 21, and that such adjustment will adjust the movement of the cross-head 13 and, therefore, the movement of the cores 17 of cables 18, in turn determining the sweep angle of the wiper arms and blades. Further, if the weather conditions are such that the power unit, at least on movement of the wiper arms and blades away from the center of travel towards the outside limits of travel, cannot overcome the accumulation of slush, sleet or the like, on the windshield, then the pressure on the roller 14 exerted through the crank pin 15, block 20, screw 22, collar 28 and plate 26, causes the springs 27 to be compressed, thereby permitting continued rotation of shaft 21 and thus permitting the wiper blades to operate through a restricted sweep angle.

The shaft 21 which carries the crank arm 25 and crank pin 15, as has been described, is supported in bearings 30 and 31 suitably fixed to the housing 10. Mounted at the left end of the shaft 21, as seen particularly in Figure 3, is a wormwheel 32 which meshes with a worm 33 on a shaft 34. At the other or lower end of the shaft 34, as seen in Figure 3, is a wormwheel 35 which meshes with a worm 36 on shaft 37. The latter shaft, as seen particularly in Figure 2, is the shaft of an electric motor, not shown, which motor is in an auxiliary housing 38 fixed to the main housing 10.

From the above description it will be seen that as the motor operates, the shaft 21 is caused to rotate and the yoke 13 is reciprocated, thereby causing the cores 17 of the cables 18 to reciprocate.

Each core 17 of a cable 18 is connected at its far end to a rack 40 which rack is mounted for reciprocatory movement in a housing 41. The housing 41 is provided with bushings 42 in which a wiper arm shaft 43 is mounted, the wiper arm being fixed to this shaft in any conventional manner. Clamped to shaft 43 by means of the split clamp 44 is a gear sector 45 which meshes with the rack 40. As a result of this construction it will be obvious that the reciprocatory movement of the cable core 17 and rack 40 is converted to oscillatory movement of the shaft 43 and its attached wiper arm and blade.

The wiper arms may be set to their vertical position when the yoke 13 is at the midpoint of its stroke by setting the clamp 44 of each unit in the proper position on the shaft 43. After this has been done, the sweep angle of all of the wiper arms connected to the power unit may be adjusted to a desired value by removing the cover plate 46 from the power unit and adjusting the screw 22 by inserting a screwdriver through the hole underlying the cover plate mentioned. Should any one of the wipers connected to the power unit be stalled for any reason, the springs 27 will yield, as has been described above, and all wiper arms will operate through a restricted angle.

The power unit and wiper units described above may be assembled in a number of different arrangements, a few samples of which have been given in Figures 10, 11 and 12. In Figure 10 the power unit is mounted centrally of the windshield of the vehicle and two wiper units are provided, one on either side of the windshield, with cable connections 18 leading from the central power unit to the wiper units.

In Figure 11 is shown a construction in which the power unit is mounted at one side of the windshield and a single cable connects it with an adjacent wiper unit. This wiper unit is somewhat modified to provide for the connection of the cable to the other end of its rack 40 and this cable extends to the second wiper unit which is located at the far side of the windshield. In this manner a pair of wiper arms is actuated from a single power take-off from the power unit.

In Figure 12 there is shown an arrangement in which four windshield wipers are actuated from a single power unit, which unit is mounted centrally of the windshield, with two cables leading in each direction. One of these cables is connected to a wiper unit adjacent to the power unit and the other to a wiper unit more remote from the power unit.

It will be clear that many other arrangements of the power and wiper units may be made and that, if desirable, by a combination of the arrangements of Figures 11 and 12, a greater number of wiper units than four may be operated from the single power unit.

While I have described a preferred embodiment of my invention those skilled in the art will appreciate that it is capable of many other variations and, therefore, I do not desire to be limited to this disclosure given for purposes of illustration but rather to the scope of the appended claims.

What is claimed is:

1. In a windshield wiper device, in combination, a motor, a crank arm rotatably driven by said motor, a crank pin mounted on said crank arm, a cross-head surrounding said crank pin, resilient motion translating means inter-connecting said crank pin and cross-head to actuate the latter, a plurality of windshield wiper units, means in each unit for converting reciprocatory motion to oscillatory motion, and means for transmitting reciprocatory movement from said cross-head to said motion converting means.

2. In a windshield wiper device, in combination, a motor, a crank arm rotatably driven by said motor, a crank pin mounted on said crank arm, a cross-head surrounding said crank pin, resilient motion translating means inter-connecting said crank pin and cross-head to actuate the latter, a plurality of windshield wiper units, means in each unit for converting reciprocatory motion to oscillatory motion, and means for transmitting reciprocatory movement from said cross-head to said motion converting means.

3. A windshield wiping device comprising, in combination, a motor, a crank arm rotatably driven by said motor, a crank pin on said crank arm, means for adjusting said crank pin radially along said arm, a cross-head reciprocated by said crank pin through a stroke dependent upon the adjustment of said crank pin, a windshield wiper unit, and means for converting reciprocatory motion of said cross-head to oscillatory motion of said windshield wiper unit.

4. In a power unit for a windshield wiping device, in combination, a motor, a crank arm rotatably driven by said motor, a pair of guiding elements extending substantially diametrically of said crank arm, a block mounted on said guiding elements for radial adjustment therealong, a screw threaded into said block, a collar on said screw, a plate slidably mounted on said guiding elements and extending into the path of said collar, resilient means pressing against said plate and driving said collar, screw and block to their outermost radial position as determined by the adjustment of said screw in said block, a crank pin mounted on said block, a cross-head mounted for reciprocatory motion and a roller mounted on said pin and extending into said cross-head to reciprocate said cross-head.

5. In a power unit for a windshield wiping device, in combination, a motor, a crank arm rotatably driven by said motor, a pair of guiding elements extending substantially diametrically of said crank arm, a block mounted on said guiding elements for radial adjustment therealong, a screw threaded into said block, a collar on said screw, a plate slidably mounted on said guiding elements and extending into the path of said collar, resilient means pressing against said plate and driving said collar, screw and block to their outermost radial position as determined by the adjustment of said screw in said block, a crank pin mounted on said block, a cross-head mounted for reciprocatory motion, a roller mounted on said pin and extending into said cross-head to reciprocate said cross-head, and anchorages for the cores of flexible cables integral with said cross-head.

6. In a windshield wiper device, in combination, a motor, a crank arm rotatably driven by said motor, a pair of guiding elements extending substantially diametrically of said crank arm, a block mounted on said guiding elements for radial adjustment therealong, a screw threaded into said block, a collar on said screw, a plate slidably mounted on said guiding elements and extending into the path of said collar, resilient means pressing against said plate and driving said collar, screw and block to their outermost radial position as determined by the adjustment of said screw in said block, a crank pin mounted on said block, a cross-head mounted for reciprocatory motion, a roller mounted on said pin and extending into said cross-head to reciprocate said cross-head, a plurality of windshield wiper units, and means in said wiper units for converting the reciprocatory movement of said cross-head to oscillatory of said wiper units.

7. In a windshield wiper device, in combination, a motor, a crank arm rotatably driven by said motor, a pair of guiding elements extending substantially diametrically of said crank arm, a block mounted on said guiding elements for radial adjustment therealong, a screw threaded into said block, a collar on said screw, a plate slidably mounted on said guiding elements and extending into the path of said collar, resilient means pressing against said plate and driving said collar, screw and block to their outermost radial position as determined by the adjustment of said screw in said block, a crank pin mounted on said block, a cross-head mounted for reciprocatory motion, a roller mounted on said pin and extending into said cross-head to reciprocate said cross-head, a plurality of windshield wiper units, and means for converting the reciprocatory movement of said cross-head to oscillatory movement of said windshield wiper units.

ALBERT E. WEIGELE.

REFERENCES CITED

The following references are of record in the file of this patent:

UNITED STATES PATENTS

| Number | Name | Date |
|---|---|---|
| 172,428 | Haddock | Jan. 18, 1876 |
| 970,140 | Trowbridge | Sept. 13, 1910 |
| 1,509,699 | Atchison | Sept. 23, 1924 |
| 1,576,684 | Stuart | Mar. 16, 1926 |
| 2,030,296 | Horstmann | Feb. 11, 1936 |
| 2,173,447 | Horton | Sept. 19, 1939 |
| 2,376,010 | Sacchini et al. | May 15, 1945 |
| 2,393,193 | Sacchini | Jan. 15, 1946 |

FOREIGN PATENTS

| Number | Country | Date |
|---|---|---|
| 226,535 | Great Britain | June 18, 1925 |
| 516,232 | Great Britain | Dec. 28, 1939 |